July 12, 1927.
F. G. HIRST
1,635,413
LUBRICATION OF VEHICLE SPRINGS
Filed Feb. 23, 1922
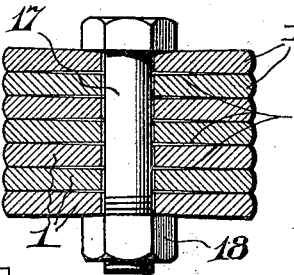
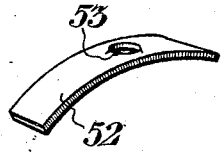
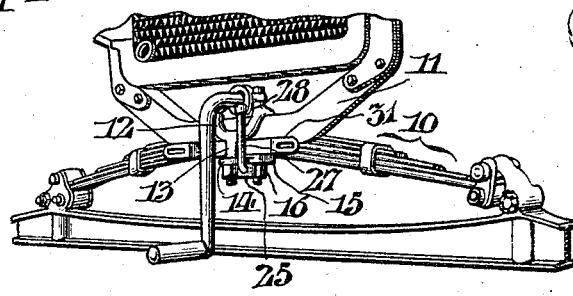
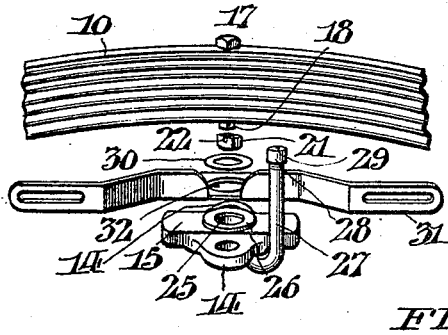
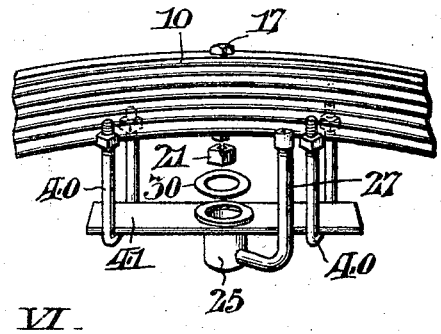
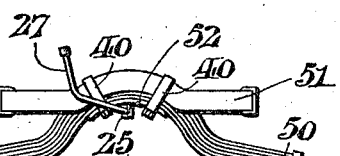

Patented July 12, 1927.

1,635,413

UNITED STATES PATENT OFFICE.

FRANKLIN G. HIRST, OF PHILADELPHIA, PENNSYLVANIA.

LUBRICATION OF VEHICLE SPRINGS.

Continuation of application filed April 4, 1921, Serial No. 458,380. This application filed February 23, 1922. Serial No. 538,532.

My invention relates to the lubrication of vehicle springs and the like, and is very suitable and advantageous for the springs of motor vehicles such as automobiles and trucks. The invention is particularly concerned with the internal or "interlaminal" lubrication of leaf springs, including those of the more usual curved and elliptical type.

One important object of my invention is to lubricate leaf springs in a simple and effective manner, and to obviate all necessity for special construction or modification of the springs or their component leaves. I aim to effect the lubrication by means of simple devices, adapted to be easily and quickly applied to springs already in service on motor vehicles,—even by relatively unskilled and inexperienced persons. I also aim to provide for cleansing or freeing such springs of dirt, rust, or adhesion between the leaves (so as to enhance the good effects of lubrication) as easily and conveniently as possible, without need of taking the leaves apart or even dismounting the springs.

Since most of the spring troubles and failures on motor vehicles are due to lack or ineffectiveness of lubrication in the springs, my invention not only makes such vehicles ride more smoothly and comfortably,—with less jolting and bouncing,—but also reduces the expenditure for repairs, and minimizes accidents due to breakage of springs.

Hitherto, it has been proposed to groove or channel the upper faces of spring leaves for the purpose of conveying lubricant between them. The formation of such grooves or channels is a troublesome and costly operation, and makes the hardening and tempering of the springs rather delicate and expensive; also, the channeling weakens the springs, and does not give very satisfactory distribution of the oil.

I have discovered, however, that such grooving or channeling can be dispensed with, and its disadvantages in manufacture and service avoided or obviated. At the same time, perfectly uniform and satisfactory distribution of lubricant between the springs can be secured. For this purpose, it is of advantage for the faces of the leaves to be hollowed or concaved transversely somewhat. Such hollowing or concaving can be produced during manufacture of the leaves, without any of the expensive special operations required to form grooves or channels in them. Indeed, I have found that the faces of automobile spring leaves on the market today present a degree of concavity (produced as an incident of manufacture by the usual methods of present practice) that ordinarily suffices for the purposes of my invention when lubricating oil is suitably introduced between the leaves.

Various means may be employed for introducing oil between superposed spring leaves with their juxtaposed faces plain and unchanneled, in order to lubricate the springs in accordance with my invention. The means which I have devised for this purpose affords special advantages which will become apparent from my description hereinafter of the best form and embodiment known to me. As will readily be perceived by those skilled in the art, however, this means can also be employed to advantage with springs composed of facially channeled leaves.

My present application is a continuation of my prior application Serial No. 458,380, filed April 4, 1921, for "Leaf spring lubricating device," as to common features disclosed in the two applications.

In the drawings, Fig. I is a somewhat diagrammatic and exaggerated transverse sectional view, illustrating a facial hollowing or concavity of superposed spring leaves such as adapts a spring for lubrication in accordance with my invention,—on a larger scale than the other figures.

Fig. II is a fragmentary front view of a motor vehicle of a light and popular make, illustrating the application of my lubricating device to its forward spring to lubricate the same in accordance with my invention.

Fig. III is a cross section through the central portion of the spring and adjacent parts of the vehicle frame showing the lubricating device in place.

Fig. III$^a$ shows a horizontal section, taken as indicated by the line III$^a$—III$^a$ in Fig. III, through a lubricating receptacle and a bolt extending thereinto, and illustrates the relations between the receptacle and a nut on the bolt.

Fig. IV is a fragmentary "exploded" view of the front spring along with the various parts of my device, on a larger scale than Fig. II.

Fig. V is a similar view illustrating certain modifications that adapt the device to a front spring arrangement used on Ford cars of older models.

Fig. VI is a similar view illustrating certain modifications that adapt the device to the rear springs of Ford cars.

Fig. VII is a perspective view of one of the parts used in the latter application; and Fig. VIII is a perspective view of a special washer which may be used in either of the applications of my invention aforesaid.

The Ford car springs shown in the drawings are of the superposed leaf type. The leaves 1 of such springs are concaved on both faces, as an incident of manufacture, to a degree sufficient for the purposes of my invention,—as indicated by the interspaces 2 in Fig. I due to their concavity.

In the customary Ford construction illustrated in Figs. II and III, the front spring 10 is secured to the superjacent member 11 of the vehicle body frame by means of a special inverted U-shaped or yoke-like spring clip 12 embracing them. The screw-threaded clip legs 13 extend down through apertured ears or lugs 14 on a plate member 15, which is clamped and held against the lower side of the spring 10 by means of nuts 16 on the bolt-like legs 13. For convenience, the leaves are secured together independently of the clip 12, partly by means of a bolt 17 extending through the entire set at the middle of the spring 10. The removable head member or nut 18 of the bolt 17 is accommodated in a central opening (shown as a round hole located between its clip-leg holes) in the member 15. A sheet metal license-tag clip (not shown), apertured to take the legs 13, is usually interposed between the spring 10 and the member 15.

In applying my lubricating device here illustrated to this spring arrangement, I first remove the member 15 and the usual license-tag bracket or clip (not shown). In actual practice, the main clip part 12 need not be removed: it is omitted from Fig. IV, however, in order to render other parts more clearly and completely visible. I then remove the usual nut 18 from the securing bolt 17, and either substitute a special head member or nut 21 (here shown as hexagonal) in whose upper side are a number of radial grooves or channels 22, or interpose a grooved washer such as shown in Fig. VIII. In either case, a grooved nut is in effect provided; and means of communication is thus afforded between the clearance space in the spring leaves around the bolt 17 and the exterior of the nut 21, at the side of the nut adjacent the spring 10, without necessity for replacing or doing anything to the bolt. Before replacing the member 15, I insert in its central opening a cup-like oil receptacle 25 whose upper end or lip 26 comprises an external supporting flange adapted to rest and bear against the upper side of the member 15. Into a tapped opening in the lower portion of the receptacle 25, I screw a bent tube 27 on whose upper end is screwed a cap 28 with a vent or oil hole 29, see Fig. III. The upward extending portion of the tube 27 serves as a sort of stand pipe or reservoir for supplying oil to the receptacle 25 and to oil the leaves of the spring, extending upward past the spring 10 and the superjacent body member 11.

The usual clearance of the holes in the spring leaves 1 around the bolt 17 affords a channel extending upward through the set along the bolt, and the channel grooves 22 of the nut 21 put this upward channel in free communication with the interior of the receptacle 25; so that oil from the receptacle 25 may ascend in the upward channel and be distributed lengthwise of the leaves 1 via their interspaces 2. The upper bolt head closes the ascending channel through the leaves 1 at its upper end and prevents escape of oil there.

In order to insure against leakage between the upper edge or lip 26 of the receptacle 25 and the lower side of the spring 10, a flat annular gasket 30 may be interposed between them. As shown, the surface of the lip 26 toward the lower side of the bent or curved spring 10 is reduced outward somewhat, by rounding its spherically to a suitable radius, so that the longitudinal curvature or concavity of the lower spring surface (due to the bend or curvature of the spring 10 in ascending arc as shown) shall not entail excessive local squeezing of the gasket 30 when the nuts 14 are drawn up on the part 15 sufficiently to make the joint tight all around. The ordinary license-tag bracket may be replaced by the special sheet metal bracket 31, whose flat portion between the member 15 and the lower side of the spring 10 has an opening 32 to accommodate the receptacle flange 26.

As here shown (Figs. III and III$^a$), the receptacle 25 is of such internal diameter as to engage somewhat loosely and be thereby centered around the bolt head member 21. The gasket 30 engages and is centered around the member 21 in like manner. Also, the part 15 engages closely but loosely around the receptacle 25, and is thereby centered thereabout and with reference to the bolt 17. The opening 32 in the license-tag bracket 31 is of such diameter that the bracket engages closely but loosely around the receptacle flange 26, and is thus properly centered and allocated. As shown, the gasket 30 is of somewhat greater outside diameter than the flange 26, and the hole 32, so that the margin of the gasket is squeezed against the bracket to hold the latter firm against rattling.

By means of the device just described, oil for lubrication can be introduced at the lower end of the upward channel through the spring leaves 1, to ascend in said channel and be distributed between the leaves as already indicated. In like manner, compressed air, kerosene oil, or other cleansing agent can be introduced and forced out between the spring leaves 1, so as to remove dirt or rust that may either be clogging their interspaces against passage of lubricating oil, or else be causing interadhesion of the leaves or otherwise resisting their free and easy movement relative to one another,—or both. If the spring has been in service any great length of time, it may be found advisible to blow kerosene through with a tire pump from time to time for several days after the lubricating device is installed.

Whether a lubricant or a cleansing agent is being used, the absence of channel grooves in the superposed leaf surfaces will cause a more general and complete distribution of the agent between the leaves, and hence give more extensive and perfect lubrication or cleansing. For when there are grooves or other such special and definite channels, the lubricant or other agent tends to simply follow the paths of least resistance thus marked out for it; whereas in the absence of such channels, it penetrates and permeates all through the interspaces between the leaves in seeking and clearing a passage for itself throughout their length. With the ascending arc form and arrangement of the spring 10, gravity aids in causing the oil to flow lengthwise toward either end of the spring, once it has entered the interspaces 2 at the high point of the arc.

In the older Ford construction illustrated in Fig. V, the front spring 10 is secured to the superjacent body frame member (not shown) by a pair of the usual stirrup yoke clips 40, 40, instead of by the special clip 12 of Figs. II and III, and there is no part corresponding to the plate member 15. In this case, therefore, I employ a special plate member 41 with a central aperture for the receptacle 25 corresponding in size to the central aperture of the part 15. The ends of this member 41 are clamped and held against the bottom of the spring 10 by the clips 40, 40, and thus the receptacle 25 is also held thereagainst. In effect, the plate 41 forms with the stirrup yokes 40 a special clip analogous to that of Fig. 1.

The rear spring 50 shown in Fig. VI is bent and curved in ascending arc much more sharply than the front spring 10 of Figs. II—IV, and is secured to the superjacent body frame member 51 by the same ordinary stirrup-clips 40, 40 as in Fig. III. Owing to the greater bend or curvature of the spring 50, I prefer to employ a plate member 52 correspondingly bent or curved in ascending arc, so as to be easily clamped up tight enough in the bend of the spring to hold the receptacle 25 firmly against the spring. In order to afford adequate and substantially plane or uniform bearing for the receptacle flange 26, I prefer to provide an upstanding seat 53 about the receptacle opening in the member 52. When the member 52 is made of sheet metal apertured and bent to shape, the seat 53 can readily be formed by pressing against a plane surface from the concave side with a punch somewhat larger than the hole.

While I have described my invention and my lubricating device with special reference to use on a Ford car with bowed leaf springs arranged in ascending arc, it will be apparent that in its broader aspects the invention is not limited to the Ford car, nor to this particular type or arrangement of springs, nor even to the particular form and arrangement of the lubricating device shown, but can, on the contrary, be otherwise applied, adapted, carried out, or embodied.

Having thus described my invention, I claim:

1. The combination with a leaf spring comprising a set of superposed leaves, a securing bolt extending through them with a channel along its exterior, and a head member against the spring; of an oil receptacle mounted about and internally engaging said head member, and thereby centered around it, with its interior in communication with said channel.

2. The combination with a leaf spring comprising a set of superposed leaves, and a securing bolt extending through them with a channel therealong and a head member against the spring; of an oil receptacle internally engaging said head member and thereby centered about it, with means of communication between its interior and said channel at the side of said head member adjacent the spring, and means for holding said receptacle against the spring.

3. The combination with a leaf spring comprising a set of superposed leaves, and a securing bolt extending through them with a channel therealong and a head member against the spring; of an oil receptacle about said head member, with means of communication between its interior and said channel at the side of said head member adjacent the spring; and a gasket interposed between receptacle and spring internally engaging said head member and thereby centered around it.

4. The combination with a vehicle leaf spring comprising a set of superposed leaves, and a securing bolt extending through them with a channel therealong and a head member against the spring; of an externally flanged oil receptacle internally engaging said head member and thereby centered about it, with its interior in communication with said channel; an apertured member around said receptacle against its aforesaid flange serving to hold the receptacle against the spring; and a gasket interposed between said receptacle and the spring also internally engaging and thereby centered around said head member.

5. The combination with a bent vehicle leaf spring comprising a set of superposed leaves having a channel through them within the bend, of an externally flanged oil receptacle with its interior in communication with said channel; and an apertured bent member around said receptacle in the bend of the spring, with a seat about the opening outstanding toward the spring and affording a plane bearing for the aforesaid flange, and serving to hold the receptacle against the spring.

6. The combination with a vehicle body member and a subjacent spring comprising a set of superposed leaves having a channel through them; of a clip for securing said spring to said member, including a part at the lower side of said spring with an oil receptacle in communication with said channel; and a standpipe screwed into the wall of said chamber and extending upward past said spring and the superjacent body member.

7. The combination with a vehicle spring comprising a set of superposed leaves having a channel through them; of a clip including a member with an opening at the lower side of said spring; an oil receptacle seated in said opening, with its interior in communication with said channel; and a standpipe screwed into the wall of said receptacle below said apertured member.

8. The combination with a vehicle spring comprising a set of superposed leaves, a securing bolt extending through them with a channel along its exterior, and a superjacent body frame member; of a clip for securing the spring to said body frame member, including means embracing member and spring and an apertured plate secured thereby at the lower side of the spring; an oil receptacle seated in the opening of said plate; a removable nut on said bolt affording communication between said channel and the interior of said receptacle; and a standpipe detachably secured to said receptacle below said plate.

9. The combination with a vehicle spring comprising a set of superposed leaves having a channel through them; of a clip including an apertured member at the lower side of said spring; an oil receptacle seated in the opening of said member against the lower side of said spring, with its interior in communication with said channel; and a license tag bracket with an apertured portion around said receptacle, between the spring and the aforesaid apertured member.

In testimony whereof, I have hereunto signed my name at Philadelphia, Pennsylvania, this 16th day of February, 1922.

FRANKLIN G. HIRST.